S. ROGERS & A. J. MASON.
Bee-Hives.

No. 142,281.  Patented August 26, 1873.

Witnesses:  Inventors:

UNITED STATES PATENT OFFICE.

SOLOMON ROGERS AND ALBERT J. MASON, OF BUTLER, INDIANA.

IMPROVEMENT IN BEE-HIVES.

Specification forming part of Letters Patent No. 142,281, dated August 26, 1873; application filed April 14, 1873.

*To all whom it may concern:*

Be it known that we, SOLOMON ROGERS and ALBERT J. MASON, of Butler, in the county of De Kalb, State of Indiana, have invented certain Improvements in Bee-Hives, of which the following is a specification:

We refer to a patent granted to us for improvements in bee-hives dated September 24, 1872, and numbered 131,628.

The object of our invention is, first, to provide for the passage of air into the cap of the hive without allowing the bees to enter the same; and, secondly, to provide for means of placing the hive level, and causing the bottom of the same to be lowered, when desired, without disturbing the hive further than unfastening the hooks holding the bottom to the sides. It consists in placing an attachment to the honey-board, between the honey-boxes. In said attachment or division-board are cut holes at certain distances apart. The upper sides of the board are covered with perforated sheet-metal, the perforations being so fine that no bees can pass through, but admit of a free circulation of air into and through the cap. On the sides of the caps are cut two or more holes, which are inside covered with finely-perforated sheet metal or other material, and on the outside provided with a shutter. To the front part of the hive, underneath the bottom-board, are placed two or more pins, which pass through holes cut in the bottom board.

In order to more fully describe our invention, we refer to the accompanying drawing.

Figure 1:
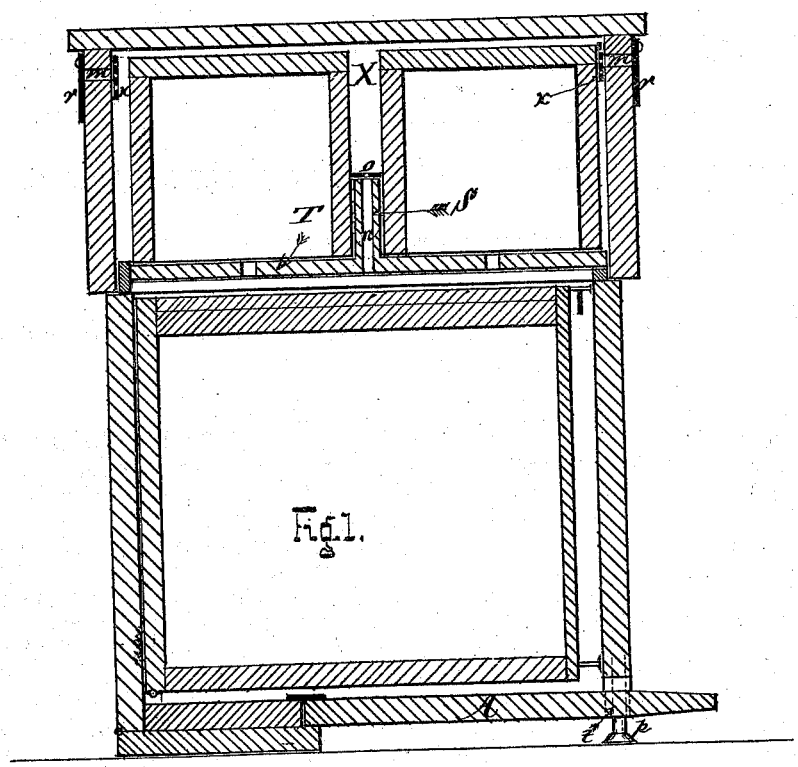
Figure 2:
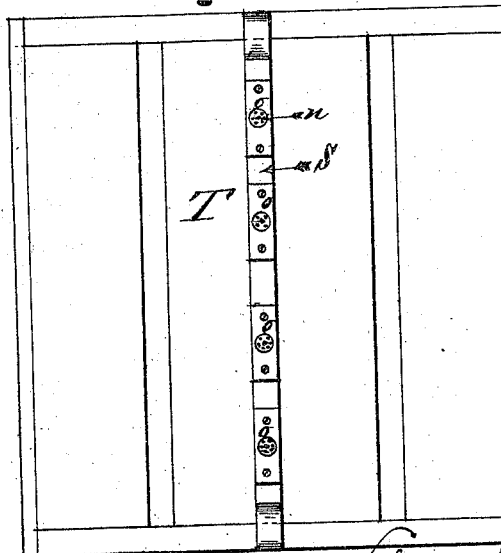

Figure 1 is a sectional view of a bee-hive embodying our invention. Fig. 2 is a detached plan view of the honey-board embodying our invention.

T is the honey-board. S is the attachment or division board to the honey-board. Orifices or holes $n\ n\ n$ are cut vertically through the center of the board S, and are covered at the top with perforated sheet metal $o\ o$. $m\ m$ are apertures or holes cut through the sides and at the top of cap X, and are covered inside with perforated sheet metal $x\ x$, and outside with shutters $r\ r$, for the purpose of closing the ventilating apertures, when so found desirable. $p\ p$ are pins passing through the holes $t\ t$ in the bottom A of the hive and into the side of the hive itself.

Having thus described our invention, we desire to claim—

The attachment or division board S, with orifices $n\ n\ n\ n$ and the apertures $m\ m$, in combination with the honey-board T and the cap X, substantially as and for the purpose set forth.

SOLOMON ROGERS.
A. J. MASON.

Witnesses:
S. D. FRALEY,
EDWARD FOSDICK.